(12) United States Patent  (10) Patent No.: US 6,417,762 B1
Comer  (45) Date of Patent: Jul. 9, 2002

(54) POWER LINE COMMUNICATION SYSTEM USING ANTI-RESONANCE ISOLATION AND VIRTUAL EARTH GROUND SIGNALING

(75) Inventor: Donald T. Comer, Mapleton, UT (US)

(73) Assignee: Comcircuits, American Fork, UT (US)

( * ) Notice: Subject to any disclaimer, the term of this patent is extended or adjusted under 35 U.S.C. 154(b) by 0 days.

(21) Appl. No.: 09/822,695

(22) Filed: Mar. 30, 2001

(51) Int. Cl.[7] .............................................. H04M 11/04
(52) U.S. Cl. ........................... 340/310.01; 340/310.02; 340/310.03; 340/10.05; 340/310.07
(58) Field of Search ....................... 340/310.01, 310.02, 340/310.03, 310.05, 310.07, 310.08, 538; 375/259

(56) References Cited

U.S. PATENT DOCUMENTS

| | | | |
|---|---|---|---|
| 3,702,460 A | 11/1972 | Blose | 340/150 |
| 3,810,096 A | 5/1974 | Kabat et al. | 340/147 R |
| 4,016,429 A * | 4/1977 | Vercellotti | 340/310.01 |
| 4,307,380 A | 12/1981 | Gander | 340/310 R |
| 4,408,186 A | 10/1983 | Howell | 340/310 A |
| 4,433,326 A | 2/1984 | Howell | 340/310 A |
| 4,697,166 A | 9/1987 | Warnagiris et al. | 340/310 R |
| 4,815,106 A * | 3/1989 | Propp et al. | 340/310.01 |
| 4,864,589 A | 9/1989 | Endo | 375/1 |
| 5,666,255 A * | 9/1997 | Muelleman | 361/111 |
| 5,781,386 A * | 7/1998 | Muelleman | 361/50 |
| 5,818,127 A * | 10/1998 | Abraham | 340/310.07 |
| 5,982,276 A | 11/1999 | Stewart | 340/310.01 |
| 6,040,969 A * | 3/2000 | Winch et al. | 340/635 |
| 6,104,707 A * | 8/2000 | Abraham | 340/310.01 |
| 6,166,458 A * | 12/2000 | Redburn et al. | 307/105 |

* cited by examiner

*Primary Examiner*—Jeffery Hofsass
*Assistant Examiner*—Daniel Previl
(74) *Attorney, Agent, or Firm*—Workman, Nydegger & Seeley

(57) ABSTRACT

A method and system for transmitting and receiving high-frequency electrical communication signals over a previously installed building power line network is presented, in which minimal or no electrical modifications of the power line network are required. A high-frequency signal is impressed between earth ground/neutral and building ground power lines that are tied into a common ground bar at a service panel. The high-frequency signal isolates the earth ground line/neutral and building ground lines by creating an "anti-resonant" condition. Since building ground is required by electrical safety codes to be present at all electrical outlets within the building, the carrier signals can be transmitted and received from any electrical outlet within the building. The high-frequency communication signals are not impressed on load carrying wires of the power line network, and are consequently not subject to the bandwidth, noise and high-voltage problems associated with other power line communication methods.

20 Claims, 8 Drawing Sheets

POWER LINE COMMUNICATION SYSTEM USING ANTI-RESONANCE ISOLATION AND VIRTUAL EARTH GROUND SIGNALING

BACKGROUND OF THE INVENTION

1. The Field of the Invention

This invention relates to a method and system for transmitting high frequency communication signals over a pre-existing building power line network. More particularly, the present invention relates to a method and system for using anti-resonance isolation and virtual earth ground signaling to transmit communication signals over wires of a power line network.

2. The Relevant Technology

The ability to freely access data on a network and to transfer information between electrical apparatus can dramatically increase productivity and efficiency. Networking is beneficial for businesses, as well as for residential uses. Transfer of data over a network is typically accomplished with a telephone line or cable. Accordingly, many buildings are wired for local access network (LAN) connectivity. Some buildings, however, particularly older residential, business, and military buildings, are not appropriately wired for LAN. These buildings must either be rewired, or an alternative means for networking must be used. Because the costs of rewiring a building can be prohibitive, it is desirable to provide an efficient means of networking over preexisting building wires. One such means includes the transfer of communication signals over preexisting power transmission lines.

The use of power transmission lines as a communication network is well known in the art. Early inventors contemplated sending communication signals directly over the load carrying conductors of the power line. There are problems, however, associated with transmitting communication signals over load carrying conductors (wires). Perhaps the most significant problem, is 'noise,' which is resident in all power line networks.

Noise is generated in the load carrying conductors by the high voltage alternating power, the discontinuities in impedances caused by various branch circuits, transients and impedance changes produced by power load switching, and isolation of the power line network into separate circuits. Noise makes it difficult to transmit high frequency signals over long distances due to line losses, radiation, and impedance mismatches.

Noise also interferes with the transmission of communication signals by limiting the capacity of the network to transmit reliable communication signals. The constraining effect of noise on data transmission is defined by the Hartley-Shannon Law, in which $C=B*\log_2(1+P/N)$ bits/s. In this equation, C establishes the upper limit for the rate of reliable information that can be transmitted over the conductor, B is the bandwidth, P is the average power of the transmitted signal, and N is the average power of the noise component. Accordingly, as the noise in the conductor increases, the capacity of the conductor to transmit reliable data decreases.

Various approaches have been proposed to overcome the constraints of noise and to enable reliable transmission of communication signals over power line networks. For example, in one approach, which is disclosed in U.S. Pat. No. 4,697,166, issued to Warnagiris et al., selective filters are used to separate power signals and communication signals at the transmitting and receiving ports of a communication system on a power line network. In another approach, which is disclosed in U.S. Pat. No. 4,864,589, issued to Endo, different transmission frequencies (frequency hopping) and "spread spectrum" systems are utilized to transmit communication signals over a power line network. In yet another approach, as disclosed in U.S. Pat. No. 5,982,276, issued to Stewart, electromagnetic signals are transmitted through magnetic modulation of the magnetic flux surrounding the load carrying wires. These various approaches disclose various means of transmitting communication signals over the main current carrying conductors of a power line network. They do not, however, directly address or overcome the underlying problems associated with noise, namely, limited bandwidth and slow transfer rates. Rather they simply enable the transmission of communication signals over the resident noise.

To effectively overcome slow transfer rates and limited bandwidth of noisy channels, communication signals may be transmitted over conductors with less noise, such as between the earth ground and the power line neutral, instead of using the "hot" power line, as disclosed in the prior art. By transferring communication signals between the earth ground and the power line neutral, the effects of noise are minimized because these conductors have less noise. One problem with this approach, however, is that to transmit signals between the building ground and neutral power lines, it is necessary that the two conductors be electrically isolated, which they are not.

In the prior art, as disclosed in U.S. Pat. No. 3,702,460, issued to Blose, adequate isolation between the building ground and neutral lines is accomplished by placing a transformer winding between the two conductors at the transmitting end and at the receiving end of the power line network. Although this resolves many of the problems associated with noise when using the current carrying wires of the power line network, this method is not appropriate for buildings that are wired to current electrical codes. In present residential and commercial buildings, for example, the uniform electrical code requires that the building ground, earth ground and the power line neutral be conductively tied into a common heavy bus or "tie" at the service panel. This "tie" is commonly referred to as a ground bar.

In U.S. Pat. No. 4,433,326, issued to Howell, an alternative method of isolating the building ground from the neutral line is proposed, which involves replacing the "tie" at the service panel with an inductor or transformer. This modification is intended to isolate the ground and neutral lines at high frequencies for transmitting communication signals while at the same time enabling a tie between the conductors at lower power line frequencies, so as to satisfy the safety codes. This, however, requires modification to the building wiring at the service panel and generally requires the services of a licensed electrician and the use of a special approved inductor, which can be costly. This prior art also does not resolve problems of parasitic capacitive coupling between the neutral and building ground wires.

Furthermore, by replacing the "tie" with an inductor or transformer, the problems associated with having to rewire a building to enable network connectivity are not resolved. In particular, costly professional rewiring of the power line network is still required. Accordingly, it would be desirable to provide a method and system for networking over pre-existing power lines without requiring any electrical modifications to the preexisting power lines or service panel.

BRIEF SUMMARY OF THE INVENTION

In accordance with the invention as embodied and broadly described herein, a system and method for sending and receiving high-frequency signals over a previously installed building power line network is provided. A suitable environment for practicing the present invention is a previously installed building power line network that includes an electrical service panel, a building ground line, a hot line, and a neutral/earth ground line. The service panel connects a utility phase I power line, a utility neutral power line, and a utility 115V phase II power line to preexisting building wires that include the hot line, the neutral/earth ground line and the building ground line. To comply with electrical safety standards, the service panel also includes a ground bar that provides a common conductive 'tie' for various ground and neutral wires, including an earth ground wire that connects the ground bar to the physical ground (earth).

The building wires are insulated and routed through cabling to various power outlets throughout the building. The power outlets include at least one set of three electrical contacts that are correspondingly connected to the hot, neutral and ground power lines. Each of the electrical contacts is configured to receive and electrically couple with a corresponding prong of a standard three-prong house electrical plug.

The power line communication system comprises a transmitter and a receiver. The transmitter includes a high-frequency transmitter, and at least two tuning elements, or devices. As used herein, the terms "tuning elements" and "tuning devices" are interchangeable. One tuning element is connected between a "hot" wire and a neutral wire of the transmitter and the other tuning element is connected between the neutral wire and a ground wire of the transmitter. The two tuning elements and the high-frequency transmitter are all encased within a transmitter chassis.

Two additional tuning elements are also connected to the transmitter. One of the additional tuning elements is connected between the building ground line and the chassis of the transmitter. The other additional tuning element is connected between the neutral line and the chassis of the transmitter.

The receiver includes a high-frequency receiver enclosed in a chassis along with two tuning elements. Two additional tuning elements are also connected to the receiver. One of the additional tuning elements is connected between the building ground and the chassis of the receiver. The other is connected between the neutral line and the chassis of the receiver.

The receiver and the transmitter are electrically coupled with the hot, building ground, and neutral wires, of the power line network, at remote outlet receptacles with conventional three-prong house electrical plugs. The receiver and transmitter may be located on different circuits of the power line network and may even be connected to different phases of the "hot" power. The transmitter and receiver can be located on any outlet or circuit, of the power line network, so long as they share a common service panel and ground "tie."

The positions of the transmitter and the receiver on the power lines may be reversed to allow the possibility of using switches or analog multiplexing circuits to reverse the transmit and receive functions of the transmitter and receiver, and to achieve half or full duplex communication, depending upon the type of multiplexing circuits used.

The tuning elements comprise one-port networks that include electronic circuitry for performing desired tuning. The electronic circuitry may include passive capacitors, inductors, and/or resistors, arranged to provide the desired tuning function for each of the tuning elements. The desired tuning may also be implemented with active filter components, which may employ operational amplifiers, gyrators or other active devices along with passive components.

The high-frequency transmitter generates a sinusoidal carrier signal that is modulated in accordance with an input signal. The type of modulation used may include amplitude modulation, frequency modulation, frequency shift keying, phase modulation, quadrature amplitude modulation or any other method of modulating a carrier signal to encode either analog or digital signals on the carrier. The carrier signal is impressed between the neutral and building ground wires at the power outlet where the high-frequency transmitter is installed. Even though the building ground and neutral wires are conductively tied to a common ground bar at the service panel, they will not appear as a short circuit to the high-frequency transmitter, at the power outlet, because the inductance of the electrical wires as well as the wire-to-wire capacitance is significant at high-frequencies and effectively isolates the conductors at high-frequencies. Depending on the particular tuning elements chosen for the transmitter and the receiver, the building ground and neutral wire may exhibit a transmission line effect or an antenna effect when the carrier signal is impressed between them.

The carrier signal is chosen to be at a frequency that creates a parallel resonance (anti-resonance) between the building ground and earth ground/neutral lines. This electrically isolates the building ground from the neutral line. The tuning elements, that were previously identified, further isolate the building ground from the neutral line. This anti-resonant isolation effectively provides a means for transmitting communication signals over low noise power conductors, without requiring transformer windings or other modifying hardware to isolate the earth ground line and the building ground line.

In the foregoing manner, the power line network of an existing building can be used to send and receive high-frequency signals without modifying the power line network. This feature is a significant improvement over conventional techniques that require an existing power line network to be modified or physically retrofitted to be used to transmit network data in the building. Moreover, the methods of the invention overcome high voltage noise, frequency and bandwidth limitations, impedance mismatches, and other reliability problems associated with many conventional approaches to transmitting data over power line networks. In addition, the invention can be practiced in ways that comply with generally accepted building codes.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The present invention relates to a method and system for sending and receiving high-frequency signals over a previously installed building power line network. More particularly, the present invention relates to a method and system for transmitting and receiving a communication signal that is impressed between the neutral/earth ground and building ground wires of an established power line network.

A power line network should be construed generally as a network of power lines in a building that meets current electrical safety codes and includes a "hot," neutral, and building ground power lines. The terms "power line," "line," "conductor," and "wire" are used interchangeably herein, and refer specifically to the wires in a power line network. The terms "building" and "house" are also used interchangeably, and should be construed as illustrative, and not limiting, of the present invention.

One suitable environment for practicing the present invention is a power line network complying with electrical safety standards, that includes a "hot" wire, a neutral wire, and a building ground wire, all of which are linked to the power line network through an electrical service panel, and extend to power outlets throughout a building.

Figure 1:
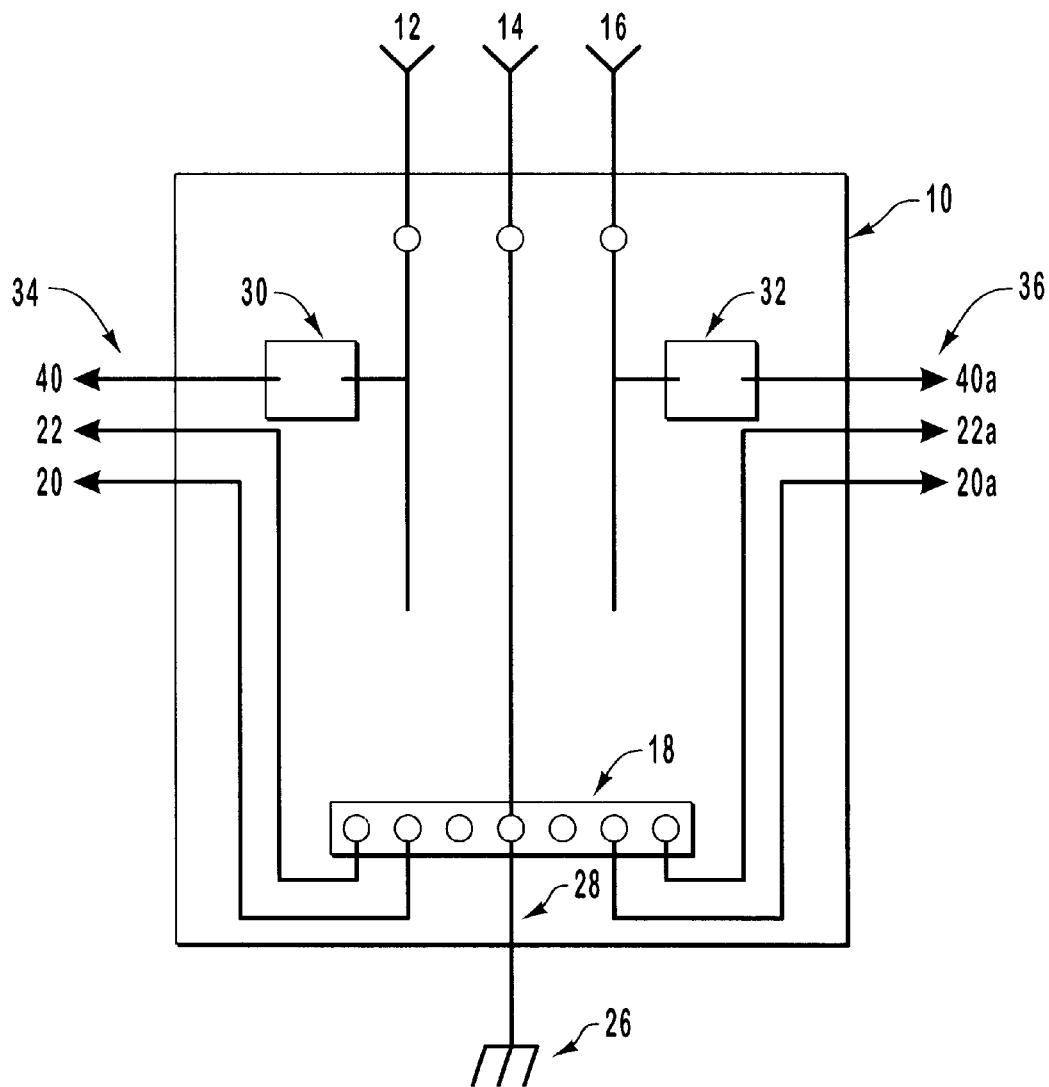
FIG. 1 illustrates a typical electrical service panel found in residential buildings, having a 115 volt phase I power line, a neutral power line, a 115 volt phase II power line, and a ground bar.

FIG. 1 illustrates one typical embodiment of an electrical service panel 10. As shown, a 115V (volt) phase I power line 12, a neutral power line 14, and a 115V phase II power line 16 enter from the top side of the electrical service panel 10. To comply with electrical safety standards, the service panel 10 also includes a ground bar 18. The ground bar 18 provides a common connection for various ground and neutral wires. Electrical safety standards require that the building ground wires 20, 20a and the neutral wires 22, 22a "tie" into the ground bar 18, which is connected to the physical earth ground 26. An earth ground 26 is created by driving a copper rod into the physical earth and by connecting the ground bar 18 to the copper rod with an earth ground bar wire 28. Alternatively, the earth ground 26 can be created by connecting the ground bar 18 to a steel pipe that is buried within the earth.

The service panel 10, as shown, also includes two circuit breakers 30, 32. One circuit breaker 30 is connected to a phase I circuit 34, and the other circuit breaker 32 is connected to a phase II circuit 36. The phase I circuit 34 includes a "hot" wire 40, a neutral wire 22 and a ground wire 20. The hot wire 40 is connected to the phase I power line 12 through a circuit breaker 30. The neutral wire 22 and the ground wire 20 are electrically connected to the ground bar 18.

Figure 2:
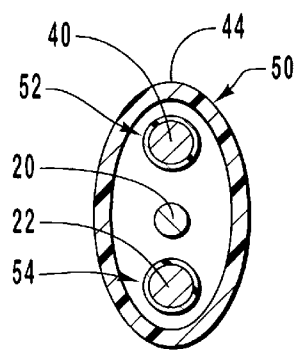
FIG. 2 illustrates a cross-sectional front view of a typical wiring cable that includes a layer of insulation encasing a "hot" wire, a building ground wire, and a neutral wire.
Figure 3:
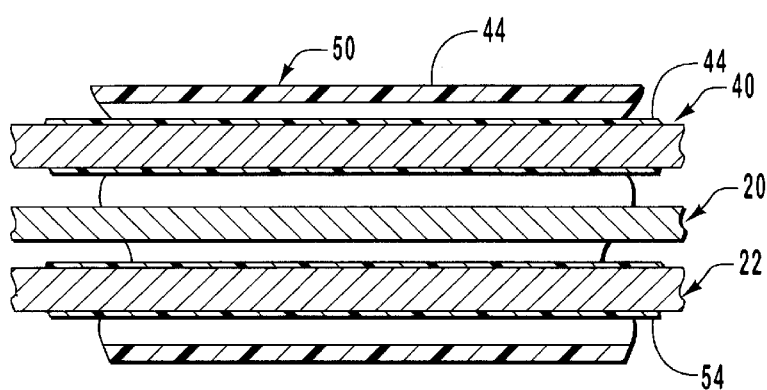
FIG. 3 illustrates a cross-sectional side view of a typical wiring cable that includes a layer of insulation encasing a "hot" wire, a building ground wire, and a neutral wire.

In a typical residential home each of the circuit wires consists of conventional 12 or 14 gauge copper wire, and is configured within the insulating sheath 44 of a cable 50, as shown in FIGS. 2 and 3. The hot wire 40 and the neutral wire 22 are provided with supplemental layers of insulation 52, 54. Typically, the hot wire 40 is color coded with black insulation 52 and the neutral wire 22 is color coded with white insulation 54. The ground wire 20 is typically bare, having no supplemental insulation. The cable 50, with corresponding circuit wires 40, 20, 22, is routed from the service panel to one or more power outlets within a building.

Returning now to FIG. 1, a phase II circuit 36 is also shown. The phase II circuit 36 is substantially similar to the phase I circuit 34. One difference, however, is that the hot wire 40a of the phase II circuit 36 is connected to a different phase power input than the phase I circuit 34. In particular, the phase II circuit 36 is connected to the phase II utility power line 16 through a second circuit breaker 32. It should be appreciated that the service panel 10 may be modified to include several phase I and phase II circuits and circuit breakers.

Figure 4:
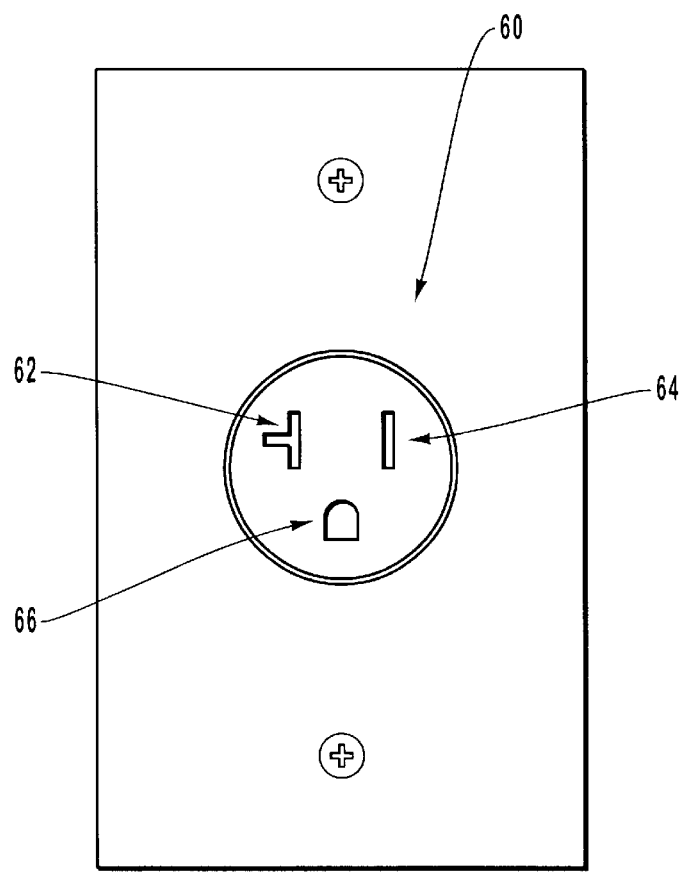
FIG. 4 illustrates a front view of typical residential power outlet that includes a hot wire contact, a neutral wire contact, and a building ground wire contact.

As mentioned earlier, the power line network wires are typically routed in cable form to various power outlets throughout a building. A typical embodiment of a suitable power outlet 60 is illustrated in FIG. 4. As shown, the power outlet 60 comprises three electrical contacts 62, 64, 66, each of which is configured to receive and electrically couple with a corresponding prong of an electrical plug. The top right contact 64 provides an electrical interface to the hot power line, the top left contact 62 provides an electrical interface to the neutral line, and the bottom round-shaped contact 66 provides an electrical interface to the building ground line. When an electrical apparatus, such as a computer, is plugged into the outlet 60, the hot and neutral lines provide electrical power to the appliance, while the building ground is electrically coupled to the case or chassis of the electrical appliance. The purpose of the building ground is to ensure that the chassis of the appliance remains grounded, even in the event of an electrical malfunction of the appliance. Under normal circumstances, there is no electrical current in the building ground wire.

The power line network, as it has been described, is a suitable environment for practicing the present invention, and in particular, as an interface for using anti-resonance isolation and virtual earth ground signaling to transmit communication signals. As will be described herein, the power line network provides a reliable network infrastructure for transmitting high-frequency communication signals over a previously installed building power line network in which no electrical modifications are required, which is an improvement over the prior art and techniques that require building power line networks to be modified or physically retrofitted.

Figure 5:
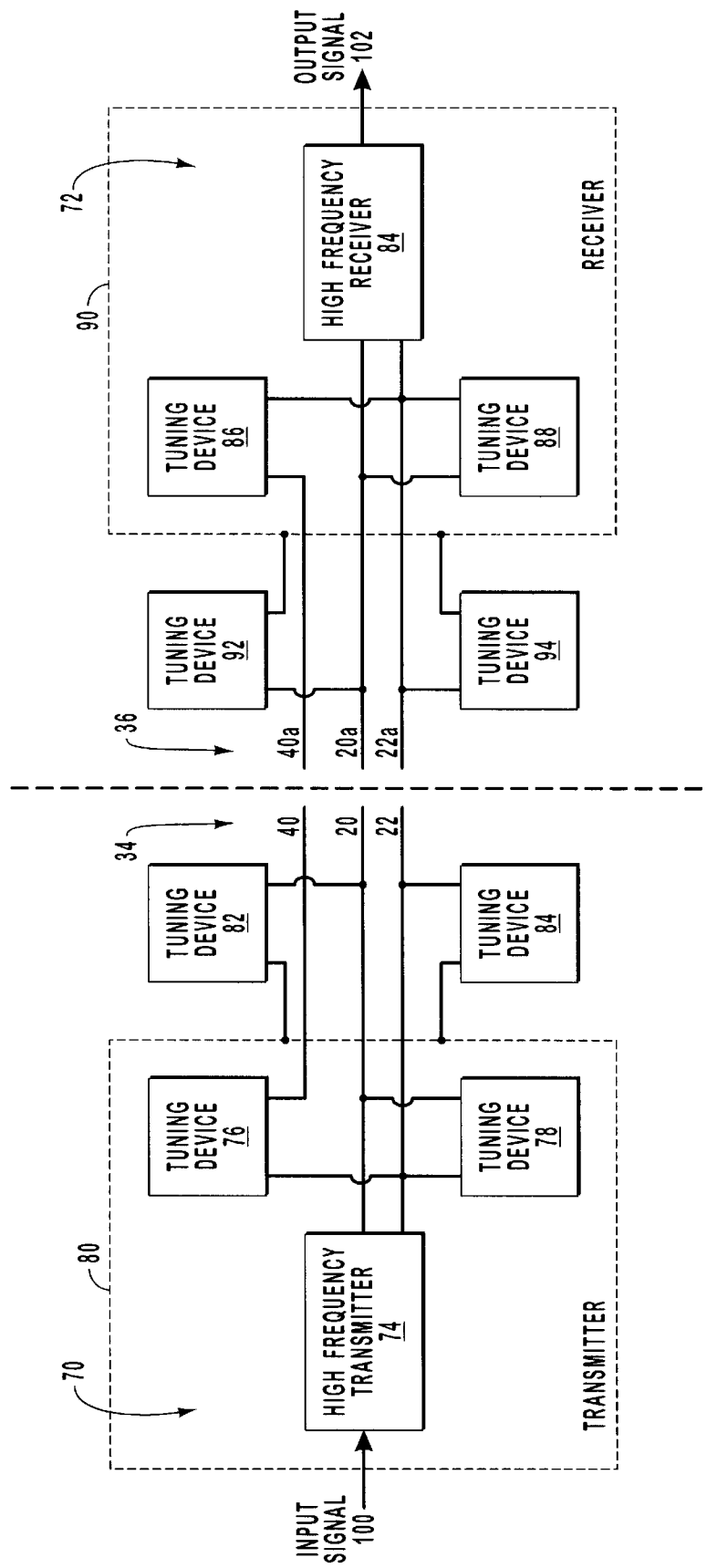
FIG. 5 illustrates one presently preferred embodiment of the power line communication system of the present invention that includes a transmitter and a receiver that are connected to wires of a power line network.

FIG. 5 illustrates one presently preferred embodiment of the power line communication system of the present invention, which includes a transmitter 70 and a receiver 72. The transmitter 70 includes a high-frequency transmitter 74 and tuning elements 76 and 78. The high-frequency transmitter 74 is directly connected to neutral wire 22 and to building ground wire 20. Tuning element 76 is connected between hot line 40 and neutral line 22. Tuning element 78 is connected between the neutral line 22 and building ground line 20. As a practical matter, the high-frequency transmitter 74 and tuning elements 76 and 78 can be conveniently housed in a common enclosure, comprising a metal transmitter chassis 80. The transmitter 70 also includes additional tuning elements 82 and 84. Additional tuning element 82 is connected between building ground line 20 and the transmitter chassis 80. The additional tuning element 84 is connected between neutral line 22 and the transmitter chassis 80.

The receiver 72 includes a high-frequency receiver 84 and tuning elements 86 and 88. The high-frequency receiver 84 is directly connected to neutral wire 22a and to building ground wire 20a. Tuning element 86 is connected between hot line 40a and neutral line 22a. Tuning element 88 is connected between neutral line 22a and building ground line 20a. The high-frequency receiver 84 and tuning elements 86 and 88 can also be housed in a common enclosure, comprising a metal receiver chassis 90. The receiver 72 also includes additional tuning elements 92 and 94. Additional tuning element 92 is connected between building ground line 20a and the receiver chassis 90. Additional tuning element 94 is connected between neutral line 22a and the receiver chassis 90.

The transmitter 70 can be connected to the power line network at a power outlet receptacle by using a conventional three-prong electrical plug to electrically couple with corresponding hot 40, neutral 22, and ground 20 wires. The receiver 72 can also be connected to corresponding hot 40a, building ground 20a, and neutral 22a wires at a remote outlet receptacle by using a conventional three-prong plug. It should be appreciated that the receiver 72 and the transmitter 70 can be located on any outlets, so long as they share a common service panel. They may even be located on different circuits 34, 36 and on different phases of AC power, so long as they share a common service panel.

It should also be appreciated that the positions of the transmitter 70 and the receiver 72 on the power lines may be reversed. Reversing positions of the transmitter 70 and receiver 72 allows the possibility of using switches or analog multiplexing circuits to reverse the transmit and receive functions from the outlets and enables half or full duplex communication, depending upon the type of multiplexing circuits used. However, for the sake of simplicity, the transmission function will be assumed to originate at the outlet that is electrically coupled with the transmitter 70 on a first circuit 34 and the receive function will be assumed to be performed by the receiver 72, at a different outlet, on a second circuit 36.

In one presently preferred embodiment, the tuning elements 76, 78, 82–88, 92, and 94 comprise one-port networks that include electronic circuitry for performing desired tuning. The electronic circuitry may include passive capacitors, inductors, and/or resistors, arranged to provide the desired tuning function for each of the tuning elements 76, 78, 82–88, 92, and 94. Alternatively, the desired tuning function may be implemented with active filter components, which may employ operational amplifiers, gyrators or other active devices along with passive components. It should be appreciated that each of the tuning elements 76, 78, 82–88, 92, and 94 is optimized to perform a desired tuning function.

During use, the high-frequency transmitter 74 generates a sinusoidal carrier signal that is modulated with an input, or information, signal 100. Accordingly, high-frequency transmitter 74 includes a carrier signal generator that generates the carrier signal and also includes a modulator for modulating the carrier signal with the input signal 100. Transmitter 70 also includes electrical conductors electrically coupled with the neutral line 22a and the building ground line 20a to physically transmit the modulated carrier signal to the power line network.

The input signal 100 can be any communication data signal, such as one used by a computer. The type of modulation used may be amplitude modulation, frequency modulation, frequency shift keying, phase modulation, quadrature amplitude modulation or any known method of modulating a carrier signal to encode either analog or digital signals on the carrier. The carrier signal is impressed between the neutral 22 and building ground 20 wires at the power outlet where the high-frequency transmitter 74 is installed. The receiver 84 demodulates the carrier signal to produce an output signal 102 at the power outlet where the receiver 84 is installed. In practice, a first computer is connected to the power outlet where the transmitter 70 is installed and a second computer is connected to the power outlet were the receiver 72 is installed. This enables the first computer to transmit communication signals through the transmitter 70 and over the power line network to the second computer through the receiver 72.

If the carrier signal of the transmitted signal is carefully chosen to be at a frequency which creates a parallel resonance (anti-resonance) between the building ground 20 and neutral line 22, then the two lines 20, 22 are electrically isolated from each other and they effectively may become transmission lines with a short circuit load (the load being the ground bar at the service panel), depending on the selection of the tuning devices. In particular, the tuning devices 76, 78, 82, 84, 86, 88, 92, and 94 may be selected to substantially match the impedance of building ground 20 and neutral line 22, whereby building ground 20 and neutral line 22 exhibit a transmission line effect. Those of skill in the art will recognize that the impedances of building ground 20 and neutral line 22 need not be exact for the transmission line effect to occur. Alternatively, the tuning devices 76, 78, 82, 84, 86, 88, 92, and 94 may be selected to substantially differentiate the impedances for building ground 20 and neutral line 22, whereby building ground 20 and neutral line 22 exhibit an antenna effect, as described in more detail below (especially with respect to FIGS. 8–10).

Briefly, a monopole antenna can be created by a wire or conductor that is electrically isolated from earth ground and driven by a signal that is connected to earth ground. The antenna wire may be oriented either horizontally or vertically with respect to the earth's surface. The orientation will determine the transmitted field pattern of the antenna and its impedance characteristics. Ideally, a monopole antenna should be made a length corresponding to one quarter wavelength of the transmitted frequency.

Although the house ground wire described with respect to embodiments of the present invention is not a perfect monopole antenna, because it is much longer than one quarter wavelength and it is not perfectly isolated from earth ground, it nevertheless will function as a mostly horizontally oriented monopole antenna and will radiate field patterns. The signals may be sensed with respect to earth ground or virtual earth grounds at any point within the range of the fields.

Another consideration in the tuning and optimization of a system according to the present invention is that the transmitted energy should be sufficient to support a reliable communication link to the desired receiver, without being excessive to the point of leaking into free space so that FCC interference rules are violated. It appears from testing that the signal levels can be made smaller in the antenna mode than in the more conventional transmission line mode, and thus the antenna mode is less likely to create FCC band interference problems.

Regardless of whether tuning devices 76, 78, 82, 84, 86, 88, 92, and 94 are selected to exhibit a transmission line effect or an antenna effect, as used herein, the term "isolated" refers to a state in which conductive elements are isolated to the extent that an electrical potential can be generated between the conductive elements sufficiently to enable a modulated carrier signal to be carried and received. As recognized by those skilled in the art, "electrical isolation" can exist in varying degrees and, for purposes of the invention, the electrical isolation between conductive elements does not need to be complete to enable the modulated carrier signal to be transmitted. It also should be noted that use of the terms "send," "receive," "impress," "broadcast," and various forms of "transmit" should be interpreted broadly to encompass either or both of the transmission line effect and the antenna effect aspects of the present invention, as may be appropriate. In view of the foregoing, the present invention provides a means for transmitting communication signals over wires of a power line network without requiring transformer windings or any other hardware to modify the power line network in order to isolate the neutral line 22 and the building ground line 20.

The frequency that causes an anti-resonance condition to occur in the building ground and neutral lines may be determined experimentally by applying a current drive signal to the lines and by monitoring the resulting output voltage. The output voltage will become maximum at an anti-resonant peak condition. The distributed nature of the wire and its interaction with other capacitive loads and junctions along its path is responsible for the occurrence of the multiple peaks observed. The resonant frequency creating the highest peak is generally chosen for operation to produce the most reliable communication signal. The frequency at which peaking occurs is a function of wire size and spacing. For example, inductance and capacitance values for a conventional 14 gauge wire will typically cause several anti-resonance peaks to occur in the 5–50 Mhz range, with the strongest resonance peaks occurring in the 20–30 Mhz range. It should be appreciated, that any of the "peaking" frequencies may be used.

Transmitter 70 includes a mechanism or structure for causing the carrier signal to have the frequency that has been selected to provide the anti-resonant condition and for identifying the selected frequency. For example, transmitter can have a simple data storage device that stores the value of the frequency once it has been identified for the particular power line network in which it is to be used. In this manner, transmitter 70 is capable of repeatedly using the selected frequency to transmit information over the power line network. In addition, transmitter 70 can include a mechanism for measuring or interpreting the value of the "peaking" frequencies described above and storing the value of the selected frequency in the data storage device.

According to the present invention, even though the building ground 20 and neutral wires 22 are tied together at the service panel ground bar, and thus are electrically shorted, they do not appear as a short circuit to the high-frequency transmitter 74 at the power outlet. This reason for this is that inductance of electrical wires, as well as wire-to-wire capacitance becomes significant at high-frequencies, which electrically isolates the neutral and building ground wires, as illustrated in FIGS. 6 and 7.

Figure 6:
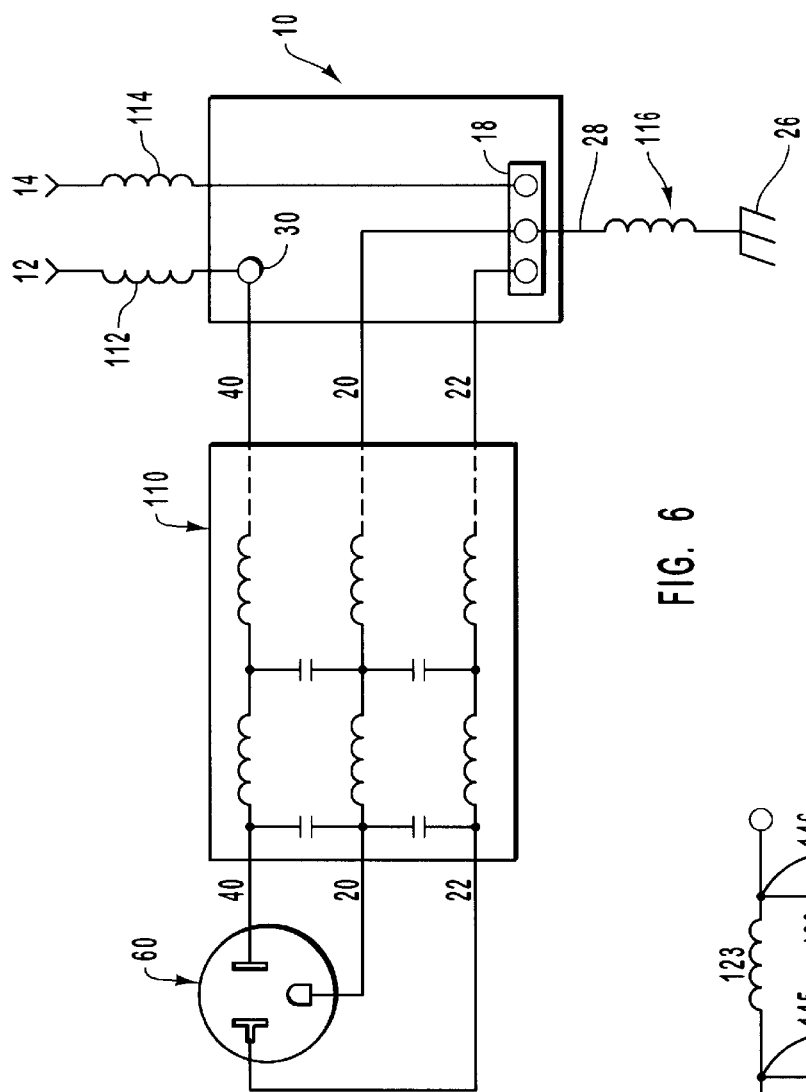
FIG. 6 illustrates a high-frequency schematic of the residential power outlet, of FIG. 4, connected to the electrical service panel, of FIG. 1.

FIG. 6 illustrates an electrical equivalent circuit of a power outlet 60 connected to a service panel 10 at high-frequencies where the wire capacitances and inductance are significant. As shown, the power outlet 60 is electrically connected to the service panel 10 through a lumped constant inductor/capacitance equivalent circuit 110. Inductors 112, 114, and 116 represent the high-frequency equivalent series inductance of the corresponding phase I power line 12, the power line neutral 14, and the ground bar wire 28.

Figure 7:
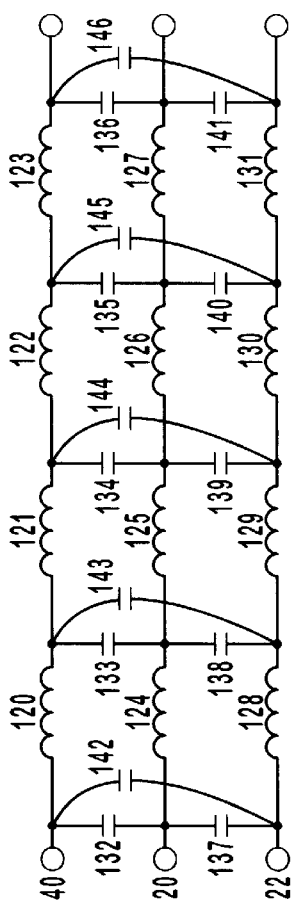
FIG. 7 illustrates an electrical equivalent circuit of a wiring cable, as embodied in FIG. 3, at high-frequencies, that includes distributed wire inductance and distributed wire-to-wire capacitance.

The distributed wire inductance and distributed wire-to-wire capacitance of the inductor/capacitance equivalent circuit 110 are illustrated in FIG. 7. As shown, the distributed series inductance of each wire 40, 20, and 22 is represented by corresponding lumped constant inductors 120–131. The distributed wire-to-wire capacitance of the ground wire 20 to the hot 40 and neutral 22 wires is represented by lumped constant capacitors 132–136 and 137–141, respectively. The capacitance between the hot 40 and the neutral wires 22 is represented by lumped constant capacitors 142–146. The representation of distributed inductance and capacitance of the electrical wires 20, 22 and 40 can be approximated by the lumped constant elements that have been identified. Values for the lumped constant inductor and capacitor elements can be measured or calculated for any given wire of known dimensions. The number of lumped constant inductors and capacitors used to represent a given length of wire may vary, depending on the length of the wire and the desired accuracy in modeling the voltages and currents at any point along the wire.

Figure 8:
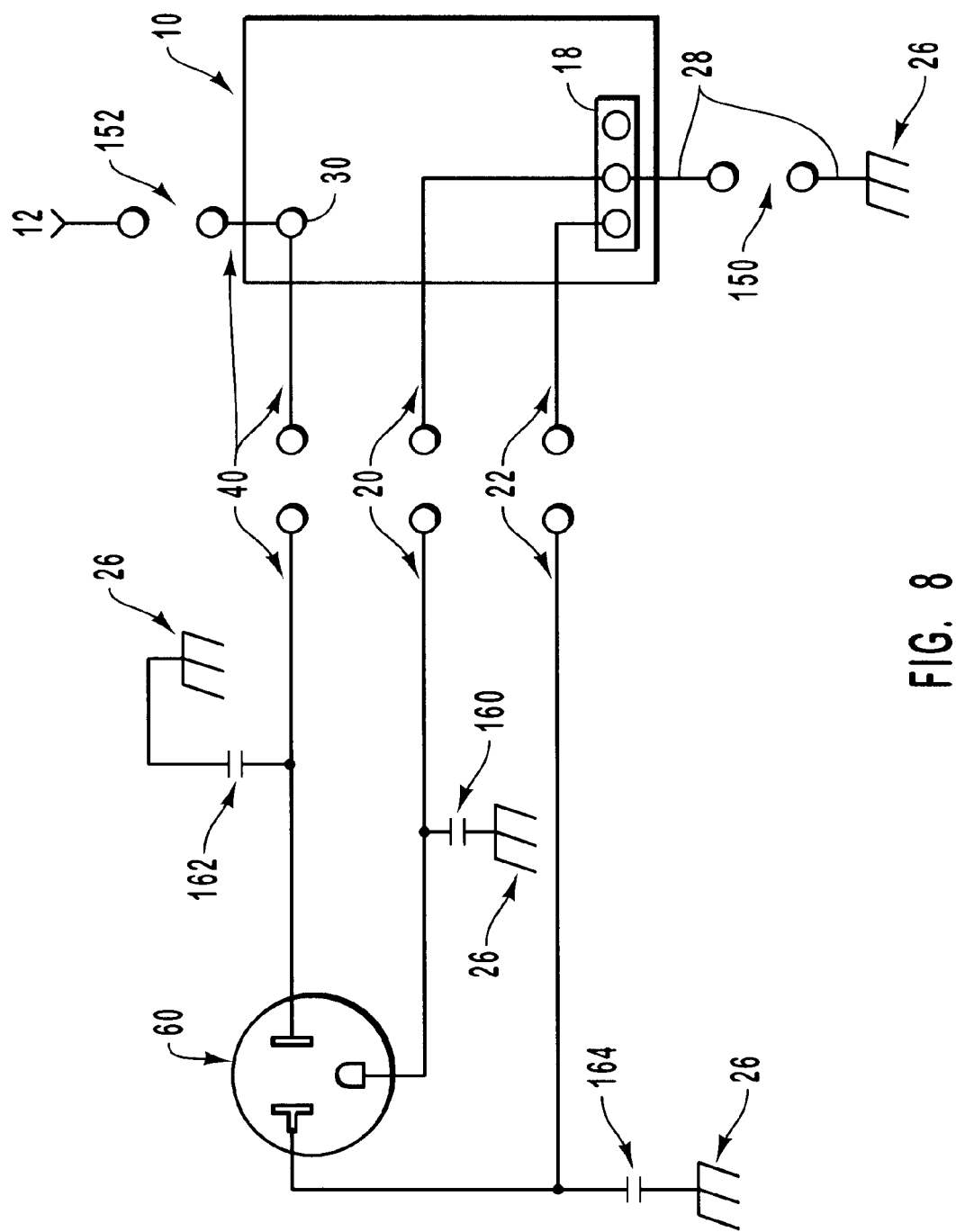
FIG. 8 illustrates a high-frequency simplified electrical equivalent circuit of the residential power outlet, embodied in FIG. 4, connected to the electrical service panel, embodied in FIG. 1.

FIG. 8 represents an equivalent circuit of a power outlet 60 connected to a service panel 10, with an anti-resonant condition existing between the building ground 20 and the neutral wire 22. Because of the anti-resonant condition, the neutral line 22 and the building ground line 20 are effectively isolated. The hot wire 40 is also assumed to be isolated from the building ground 20 because symmetry in the wires causes the anti-resonant condition between the hot 40 and building ground 20 wires to occur at the same frequency as between the neutral 22 and building ground 20 wires. It should be noted, however, that anti-resonance isolation does not exist over the entire power line network. At the point where the signal reaches the service panel 10, the building ground 20 and neutral wires 22 are electrically shorted together, at the common ground bar 18. At that point the inductance of the ground bar wire 28, from the service panel to the earth ground 26, causes an open circuit 150 to exist. Likewise, the inductance of the phase I hot line 12 causes an open circuit 152 in the hot line 40.

FIG. 8 also shows the equivalent capacitances from each of the three circuit wires 40, 20, 22 to earth ground 26. These are shown as: (1) capacitor 160, which provides a path from building ground 20 to earth ground 26; (2) capacitor 162, which provides a path from hot wire 40 to earth ground 26, and (3) capacitor 164 which provides a path from neutral 22 to earth ground 26. The capacitors 160–164 are analogous to the general representation, shown in FIG. 9, of an electrical equivalent circuit of a conductive surface that is capacitively coupled to one of the power line conductors.

Figure 9:
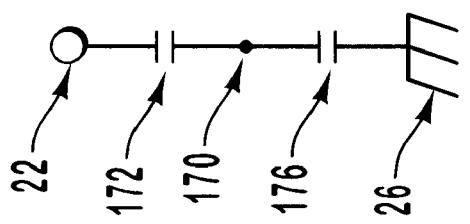
FIG. 9 illustrates an electrical equivalent circuit of a metal chassis or conductive surface that is capacitively coupled to a neutral wire of the power line network.

In FIG. 9, node 22 represents the neutral line of the power line network, but could be taken to represent any of the power lines. Node 170 represents the conductive surface of the transmitter or receiver chassis and may be referred to as virtual earth ground. Capacitance 172 represents the capacitance between the neutral line 22 and the chassis 170. Capacitance 176 represents the capacitance between the chassis 170 and earth ground 26. In electromagnetic theory, "earth" ground may be thought of as a conductive plane that covers the earth's surface with a zero voltage potential. A copper rod may be driven into the earth to ensure a reliable connection to the zero potential of the earth's surface. Other conductive surfaces may experience earth ground potential even though they may not be physically connected to earth ground. That is, a given surface may experience earth ground potential in the absence of an applied potential, but may be forced to a different potential by the addition or subtraction of electronic charge from its surface. An electrical equivalent circuit of such a conductive surface 170 appears as a capacitor 176 between the conductive surface 170 and earth ground 26, as shown. Accordingly, the conductive surface may be referred to as a "virtual earth ground," since it appears as earth ground for sufficiently high frequency sinusoidal signals, as applied in the present invention.

In the presently preferred embodiment of FIG. 5, the tuning elements 76, 78, 82–88, 92, and 94 are chosen to accomplish the maximization of capacitance between the neutral line and earth ground, while minimizing the capacitance between the building ground and earth ground at a selected frequency of operation. Choosing tuning elements 76, 78, 82–88, 92, and 94 to maximize the capacitance between the neutral line and earth ground, while minimizing the capacitance between the building ground and earth ground. enhances an antenna effect. Those of skill in the art will recognize that it is the difference in impedance that enhances the antenna effect and not necessarily which capacitance is maximized and which capacitance is minimized. However, certain conditions may exist that lead to one capacitance inherently being larger than the other, making the decision of which capacitance to maximize and which capacitance to minimize a more straight-forward choice. The description of one embodiment, therefore, should not necessarily be interpreted as excluding another. The frequency of operation is chosen at one of the possible values that produces an anti-resonant condition between the building ground and the neutral line. Under this condition, the signal generated between the building ground and earth ground may be calculated from the equivalent circuit of FIG. 10.

Figure 10:
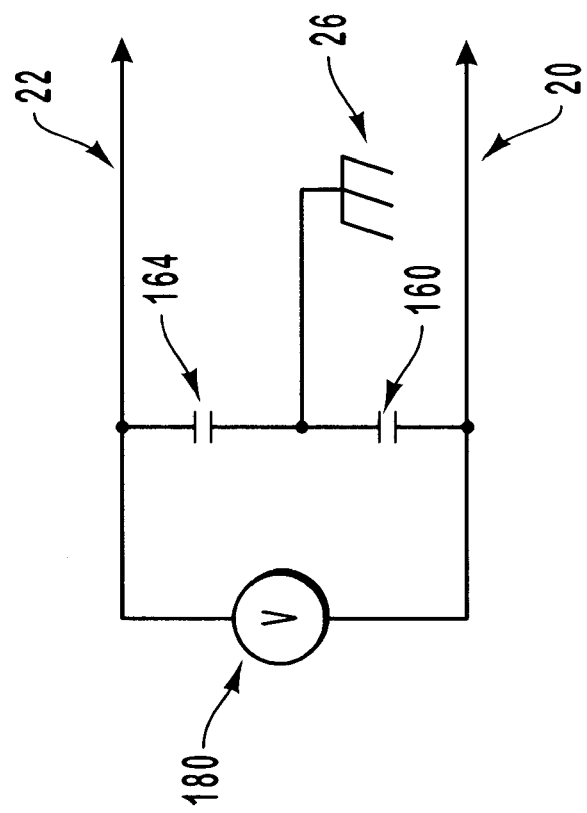
FIG. 10 illustrates a high-frequency equivalent circuit for a high-frequency transmitter signal that is applied directly at the residential power outlet that is embodied in FIG. 4.

FIG. 10 shows an equivalent circuit as seen by a high-frequency communication signal at a given outlet receptacle. The high-frequency signal is represented by the voltage source 180, which exists between neutral line 22 and building ground line 20. Capacitors 160 and 164 represent total capacitances between the building ground 20 and neutral 22 lines, respectively, to earth ground 26. If the signal 180 applied between building ground 20 and the neutral line 22 is designated V180, the resulting voltage signal between building ground 20 and the earth ground 26, designated as Vhe, is given by:

$$V_{he} = V180 * C164/(C164+C160). \quad\text{Eq. 1)}$$

Equation 1 shows that as C164 increases relative to C160, the signal Vhe approaches V180. Since the signal Vhe is the carrier signal, which carries the transmitted information to all circuits in the building, it is desirable to maximize this signal. Accordingly, by selectively using the tuning means to increase C164 and to decrease C160, it is possible to maximize the carrier signal by creating a condition in which C164 is relatively larger than C160. Practically, the capacitance C164 between the neutral line 22 and earth ground 26 can be increased by capacitively coupling the neutral line 22 to any element that has a significant capacitance to earth ground 26. For instance, referring back to FIG. 9, if the neutral line 22 is coupled through a capacitance 172 to a chassis 170 that has a capacitance 176 to earth ground 26 then the overall total capacitance Ctotal between the neutral line 22 and earth ground 26 will be given by $$C_{Total} = C172 * C176/(C172+C176). \quad\text{Eq. 2)}$$

Accordingly, in the embodiment shown in FIG. 5, the chassis 80, may be assumed to be a virtual earth ground because it is capacitively coupled to earth ground, as described. Therefore, by connecting the building ground line 20 to the chassis 80 through a capacitor the total capacitance on the neutral line 22 is increased, as per Equation 2. Tuning elements 84 and 94 accomplish this task by adding capacitance between the neutral lines 22, 22a and the two chassis 80, 90. These tuning elements 84, 94 may be implemented with a discrete component capacitor or any other circuitry that appears capacitive at the frequencies of interest.

Tuning elements 76 and 86 likewise provide for increased capacitance on the neutral lines 20, 20a, respectively. These tuning means 76, 86 couple the capacitance between the hot lines 40, 40a and the earth ground lines 22, 22a and add it to capacitance of the neutral lines 20, 20a in the frequency range of interest. Tuning elements 76 and 86 may comprise a capacitor, a series LC circuit or any other circuitry that is designed to operate at a high frequency where it appears capacitive. The proper choice of circuitry will allow the low, power line frequencies to be blocked while adding a capacitive coupling between the lines at a high frequency.

Tuning elements 78 and 88 are intended to minimize the capacitance between the building ground 20, 20a and neutral 22, 22a wires. This is accomplished by the addition of an inductive element between the two lines, which enhances the anti-resonance isolation between the two lines, specifically at the transmitting and receiving ports. The inductive elements are selected to fine-tune the anti-resonance that exists at the transmitting and receiving ports. The inductance is chosen to resonate with the distributed wire capacitance and inductance, as discussed earlier. Because the transmitter and receiver circuitry as well as other parasitic elements at the receptacle are normally capacitive, the tuning inductance is necessary to fine-tune the resonance at the transmitting and receiving ports. This fine-tuning results in a maximum signal voltage at each port at the preselected signal frequency and overcomes parasitic capacitance problems. It should be appreciated that this is an improvement over the prior art. The inductive element used for the tuning means 78 and 88 may be an actual discrete inductor or an active circuit which appears inductive at the frequency of interest.

The tuning elements 82 and 92 perform a function similar to that just described for the tuning elements 78 and 88, namely, they each create maximum isolation (minimum capacitance) between the building ground 20, 20a and the neutral 22, 22a lines at the transmitting and receiving ports.

They do this by adding an inductive element to fine-tune the anti-resonance condition between the lines. The tuning elements in each case may be a discrete inductor or an active circuit that appears inductive at the frequency of interest.

Experimental Results

Using a presently preferred embodiment of the communication system of the present invention, a test communication system was installed in a 2600 sq. ft. residential building. The building was wired to residential code and had a single service panel installed in the basement, with connection to earth ground made through metal pipes. Electrical service was distributed to the basement, main floor and upper floor through approximately 24 circuit breakers, from both phases of the "hot" line. A transmitted carrier of 1volt rms and a frequency of 32 Mhz was applied at randomly selected receptacles. A received signal of no less than 0.2 volts rms was observed at all receptacles tested. The tested receptacles were randomly selected on each of the three floor levels. After the claimed tuning elements were applied, the signal at each tested receptacle was increased to at least 0.85 volts rms in all cases. The observed noise was typically less than 20 mv.

Industrial and Commercial Embodiments

The present invention, as it has been described thus far, is intended for use in residential buildings that have a power line network that is equivalent to the power line network described with reference to FIGS. 1–4. It should be appreciated, however, that the present invention can be modified to accommodate industrial and commercial wiring codes that require all electrical service wires from the service panel to be encased in a metal conduit. These codes also require that the conduit be connected to the building ground wire at each power outlet receptacle. The conduit connection is typically accomplished by using a metal receptacle mounting box and by using an "industrial" plug receptacle that connects the building ground wire, conductive receptacle mounting frame and metal receptacle mounting box together.

Figure 11:
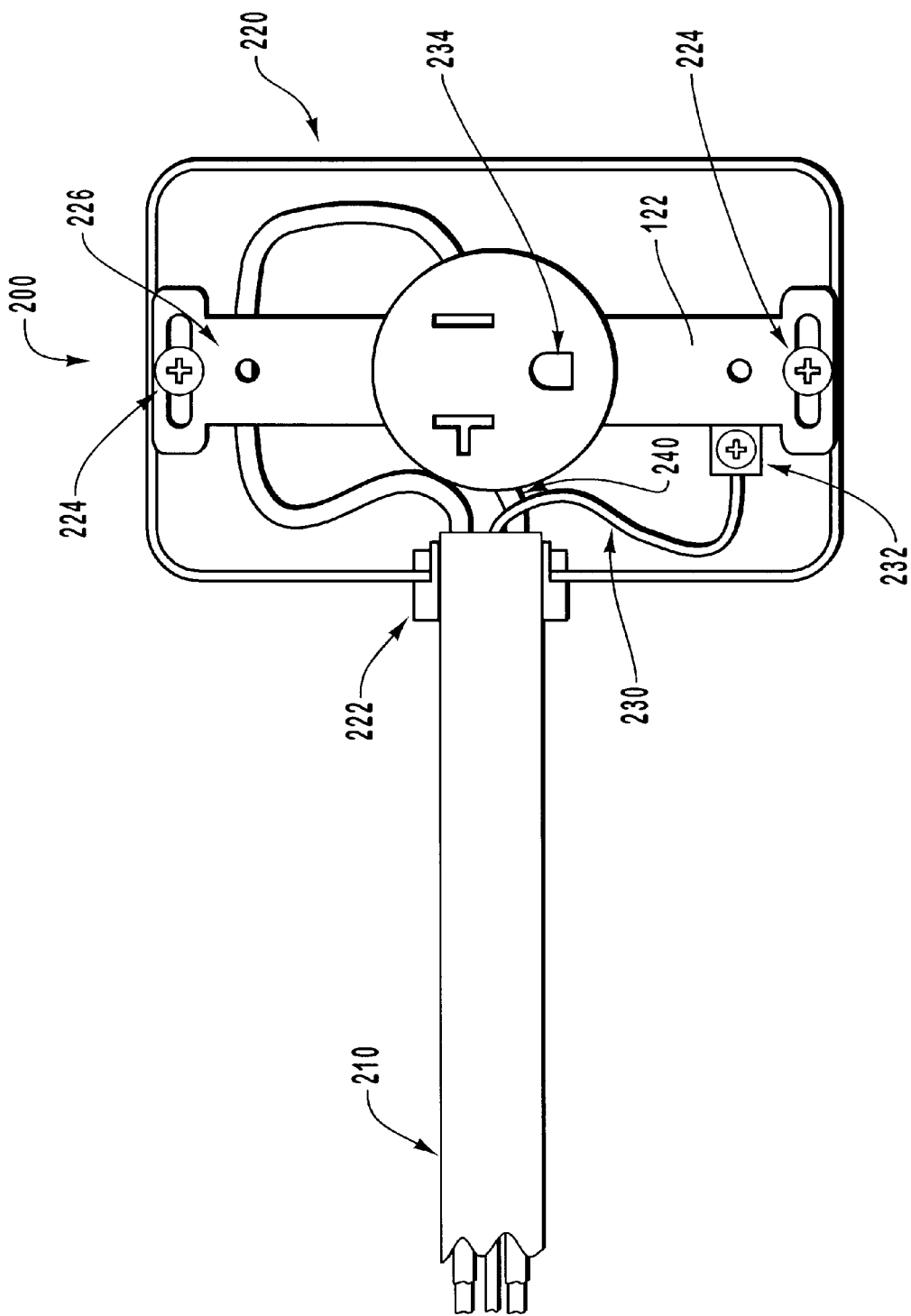
FIG. 11 illustrates a typical embodiment of an industrial power outlet that is connected to metal conduit.

FIG. 11 illustrates a typical embodiment of an industrial power outlet 200 that is connected to metal conduit 210. As shown, the metal conduit 210 is electrically connected to a metal receptacle mounting box 220 by a metal coupling 222. Metal screws 224 are used to electrically connect the metal receptacle mounting box 220 to the conductive receptacle mounting frame 226. The building ground wire 230 is electrically connected to the conductive receptacle mounting frame 226 at point 232 by a screw or by direct contact. Although not shown, the ground contact 234 of the receptacle 200 is also electrically connected to the conductive receptacle mounting frame 226. Accordingly, the ground contact 234, the receptacle mounting frame 226, the building ground wire 230, the metal coupling 222, the metal conduit 210, and the metal receptacle mounting box 220 are all electrically coupled.

In an industrial or commercial power line network, the presence of the metal conduit and all of the corresponding metal receptacle mounting boxes adds an undesirable amount of parasitic capacitance to the building ground wire 230 by virtue of the virtual earth ground, wherein the capacitance to actual earth ground is created by the conductive surface area of the conduit system. When the present invention is practiced on an industrial power line network, as described, the capacitance added by the conduit 210 to the building ground line 230 attenuates the high-frequency communication signal that exists between the neutral line 240 and the building ground 230 wires. This is evidenced by an examination of FIG. 10 and Equation 1, as previously described.

For a small amount of conduit, which produces a relatively small capacitance, the effect may be neutralized to some extent by the tuning means between the building ground and other virtual earth grounds as discussed earlier. However, if a large amount of conduit and several industrial power outlets are included in the power line network, which is typical for industrial and commercial buildings, the conduit capacitance is dominant and may result in attenuation of the communication signals to an undetectable level during use of the present invention.

One solution to this problem is to rewire the power outlet receptacles of the industrial power line network, while complying with safety code regulations, to provide the necessary high-frequency isolation between the building ground and conduit system. Although one important advantage of the present invention is to allow its application in residential buildings with no electrical power wiring modifications whatsoever, it is clear that allowing the possibility of minor wiring modifications is advantageous to extend the application of the present invention to buildings in which conduit capacitance would otherwise attenuate the communication signals.

Figure 12:
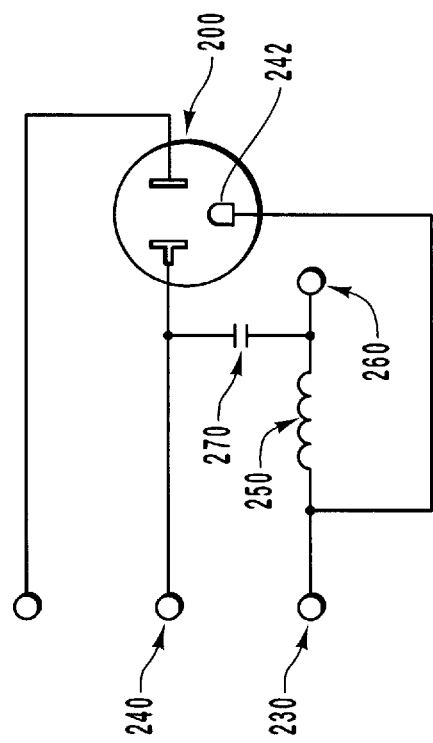
FIG. 12 illustrates a schematic of the industrial power outlet of FIG. 11 that includes an inductive element.

FIG. 12 illustrates an electrical schematic of the modified wiring suggested for each plug receptacle 200 on a conduit system of an industrial building circuit. As shown, the building ground wire 230 is electrically connected to the ground contact 242 of the power outlet 200. An inductive element 250 is included to provide high-frequency isolation between the building ground wire 230 and the conduit system that is represented by node 260. In addition a capacitor 270 is added between the neutral wire 240 and the conduit system node 260, causing an increase in the capacitance from the neutral wire 240 to earth ground at high-frequencies. This also results in an increased communication signal, in accordance with the disclosure relating to FIG. 10 and Equation 1.

The suggested rewiring can be accomplished by adding an inductor and capacitor in the metal receptacle mounting box and by connecting node 260 to the metal receptacle mounting box using standard electrical hookup wire and a bond screw. The industrial-type plug receptacle can also be replaced by a residential-type plug receptacle that electrically isolates the ground contact from the metal receptacle mounting box. A circuit rewired as described will meet the safety code requirements, provided that the inductive element is of a heavy-duty nature, so that it is considered a safe "tie" to the conduit system.

Figure 13:
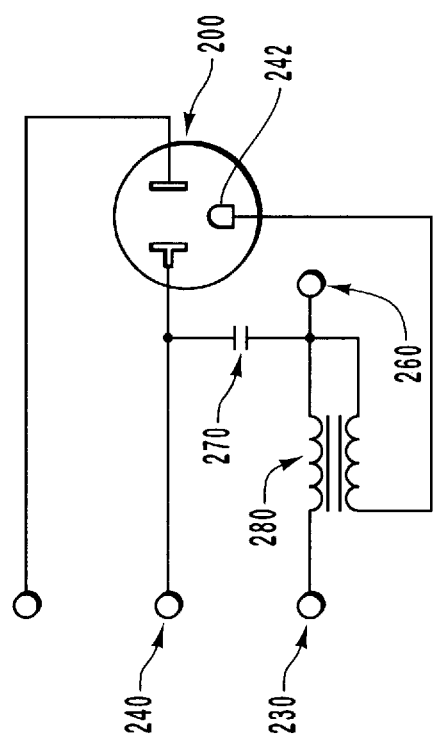
FIG. 13 illustrates a schematic of the industrial power outlet of FIG. 11 that includes a transformer.

Alternatively, it is also possible to use a transformer in place of the inductor to achieve the desired high-frequency isolation between the building ground wire 230 and the conduit system 260. FIG. 13 illustrates this alternative embodiment in which the inductor is replaced by a transformer 280. When connected as shown, the secondary winding of the transformer 280 provides a low-frequency connection between the building ground 230 and the conduit system 260, which is required to comply with safety standards, while providing high-frequency isolation that is necessary to effectively transmit communication signals over the power line network according to the present invention. The primary winding of the transformer 280 is used to couple the communication signal from the receptacle 200 to the building ground line 230. One useful feature of this alternative embodiment is that it allows for simplification of the interface circuitry used in the transmitter/receiver modules to provide the necessary high-frequency isolation.

It should be appreciated that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for carrying a signal in a building power line network that includes a neutral line of the building power line network and a building ground line of the building power line network, wherein the neutral line and the building ground line are capacitively coupled together and connected to an earth ground, the method comprising the acts of:

selecting a frequency that is capable of electrically isolating the first line from the second line by creating an anti-resonant condition between the first line and the second line;

generating a carrier signal that has the selected frequency with a transmitter that is electrically coupled with the neutral line and the building ground line;

applying a first tuning function between the neutral line and a hot line included in the building power line network; and applying a second tuning function between the neutral line and the building ground line, the first tuning function and the second tuning function being selected to increase the capacitance between the neutral line and the earth ground and to decrease the capacitance between the building ground line and the earth ground at the selected frequency;

modulating the carrier signal with an information signal such that the carrier signal carries information; and impressing the modulated carrier signal between the first line and the second line, such that the anti-resonant condition is established between the first line and the second line.

2. A method as recited in claim 1, further comprising the acts of:

applying a third tuning function between the building ground line and a chassis of the transmitter; and applying a fourth tuning function between the neutral line and the chassis, the third tuning function and the fourth tuning function being selected to increase the capacitance between the neutral line and the earth ground and to decrease the capacitance between the building ground line and the earth ground at the selected frequency.

3. A method for carrying a signal in a building power line network that includes a neutral line and a building ground line that are capacitively coupled together and connected to an earth ground, and a conductive conduit system that is electrically connected to the building ground line, the method comprising the acts of:

selecting a frequency that is capable of electrically isolating the neutral line from the building power line by creating an anti-resonant condition between the neutral line and the building power line;

generating a carrier signal that has the selected frequency;

applying a first tuning function between the building ground line and the conduit system, the first tuning function being selected to electrically isolate the building ground line from the conduit system at the selected frequency; and applying a second tuning function between the neutral line and the conduit system, the second tuning function being selected to increase the capacitance between the first line and earth ground at the selected frequency;

modulating the carrier signal with an information signal such that the carrier signal carries information; and impressing the modulated carrier signal between the neutral line and the building ground line, such that the anti-resonant condition is established between the first line and the second line.

4. A method for carrying a signal in a building power line network that includes a neutral line, a building ground line, and an earth ground that are connected one to another with a bus and further includes a conductive conduit system that is electrically connected to the building ground line, the method comprising the acts of:

providing a first tuning element that applies a first tuning function between the building ground line and the conduit system;

providing a second tuning element that applies a second tuning function between the neutral line and the conduit system;

selecting a frequency that, in combination with the first tuning element and the second tuning element, is capable of electrically isolating the neutral line from the building ground line by creating an anti-resonant condition between the neutral line and the building ground line;

generating a carrier signal that has the selected frequency;

modulating the carrier signal with an information signal such that the carrier signal carries information; and impressing the modulated carrier signal between the neutral line and the building ground line, such that the anti-resonant condition is established between the neutral line and the building ground line.

5. A method as recited in claim 4, wherein the second tuning element comprises a capacitor positioned between the neutral line and the conduit system.

6. A method as recited in claim 5, wherein the first tuning element comprises an inductor positioned between the building ground line and the conduit system.

7. A method as recited in claim 5, wherein the first tuning element comprises a transformer positioned between the building ground line and the conduit system.

8. A method as recited in claim 5, wherein:

the act of generating the carrier signal is performed by a transmitter electrically coupled with the neutral line and the building ground line through a first power outlet in a building that includes the building power line network; and the act of demodulating the carrier signal is performed by a receiver electrically coupled with the neutral line and the building ground line through a second power outlet in the building.

9. A method as recited in claim 4, wherein the act of impressing the modulated carrier signal is performed at a first location in the building power line network, the method further comprising the act of demodulating the carrier signal at a second location in the building power line network so as to obtain the information carried thereby.

10. A method as recited in claim 4, wherein the first tuning element and the second tuning element enhance one of a transmission line effect and an antenna effect.

11. A transmitter for transmitting a modulated carrier signal onto a building power line network that includes a neutral line, a building ground line, and an earth ground that are connected one to another with a bus such that the modulated carrier signal can be received at another location in the building power line network, the transmitter comprising:

a carrier signal generator that generates a carrier signal having a selected frequency that is capable of creating an anti-resonant condition between the neutral line and the building ground line;

a first tuning element for applying a first tuning function between the neutral line and a hot line included in the building power line network; and a second tuning element for applying a second tuning function between the neutral line and the building ground line, the first tuning function and the second tuning function being selected to increase the capacitance between the neutral line and the earth ground and to decrease the capacitance between the building earth line and the earth ground at the selected frequency, whereby the first tuning function and the second tuning function enhance an antenna effect;

a modulator that modulates the carrier signal with an information signal such that the carrier signal includes information encoded in the information signal; and electrical conductors adapted to be electrically coupled with the neutral line and at the building ground line for impressing the modulated carrier signal between the neutral line and the building ground line, the selected frequency electrically isolating the neutral line from the building ground line by creating the anti-resonant condition.

12. A building power line network that is capable of transmitting information signals between a first location and a second location of a building in which the building power line network resides without requiring a service panel of the building power line network to be modified to electrically isolate a first line of the building power line network from a second line of the building power line network, the building power line network comprising:

a neutral line;

a building ground line;

an earth ground;

a service panel at which the neutral line, the building ground line, and the earth ground are conductively connected one to another with a bus;

a transmitter electrically connected with the neutral line and the building ground line, the transmitter including:

a first tuning element for applying a first tuning function between the neutral line and a hot line included in the building power line network;

a second tuning element for applying a second tuning function between the neutral line and the building ground line, the first tuning function and the second tuning function being selected to increase the capacitance between the neutral line and the earth ground and to decrease the capacitance between the building ground line and the earth ground at the selected frequency, whereby the first tuning function and the second tuning function enhance an antenna effect; and means for impressing a modulated carrier signal between the neutral line and the building ground line, the modulated carrier signal having a frequency that is selected to electrically isolate the neutral line and the building ground line by creating an anti-resonant condition between the neutral line and the building ground line.

13. A building power line network as recited in claim 12, further comprising:

a third tuning element for applying a third tuning function between the building ground line and a chassis of the transmitter; and a fourth tuning element for applying a fourth tuning function between the neutral line and the chassis, the third tuning function and the fourth tuning function being selected to increase the capacitance between the neutral line and the earth ground and to decrease the capacitance between the building ground line and the earth ground at the selected frequency, whereby the third tuning function and the fourth tuning function further enhance the antenna effect.

14. A power outlet associated with a building power line network having a neutral line, a building ground line, and an earth ground that are connected one to another with a bus, the power outlet enabling a transmitter to impress a modulated carrier signal between the neutral line and the building ground line so as to transmit the modulated carrier signal to another location in the building power line network, the power outlet comprising:

a receptacle having at least a neutral contact and a ground contact;

a building ground line electrically coupled with the ground contact;

a neutral line electrically coupled with the neutral contact;

a conduit system including at least a conductive conduit containing at least a portion of the building ground line and the neutral line;

a first tuning element for applying a first tuning function between the building ground line and the conduit system, the first tuning function being selected to electrically isolate the building ground line from the earth ground when a carrier signal having a selected frequency is impressed between the neutral line and the building ground line; and a second tuning element for applying a second tuning function between the neutral line and the conduit system, the second tuning function being selected to increase the capacitance between the neutral line and earth ground when the carrier signal having the selected frequency is impressed between the neutral line and the building ground line.

15. A power outlet as recited in claim 14, further comprising a conductive receptacle mounting frame associated with the receptacle, the conductive receptacle mounting frame being electrically coupled with the building ground line.

16. A power outlet as recited in claim 15, further comprising a transmitter having electrical contacts connected with the neutral contact and the ground contact of the receptacle, wherein the transmitter generates the modulated carrier signal and impresses the modulated carrier signal between the neutral line and the building ground line.

17. A power outlet as recited in claim 14, wherein the second tuning element comprises a capacitor positioned between the neutral line and the conduit system.

18. A power outlet as recited in claim 17, wherein the first tuning element comprises an inductor positioned between the building ground line and the conduit system.

19. A power outlet as recited in claim 17, wherein the first tuning element comprises a transformer positioned between the building ground line and the conduit system.

20. A power outlet as recited in claim 14, wherein the first tuning element applying the first tuning function and the second tuning element applying the second tuning function enhance one of a transmission line effect and an antenna effect.

* * * * *